United States Patent [19]

Schiffmann

[11] 3,831,266

[45] Aug. 27, 1974

[54] METHOD FOR MAKING AN INFORMATION STORAGE DEVICE HAVING PHOTOCHROMIC AREAS OF 3.5 DICHLOROSALICYLIDENE 2,4,6 TRICHLOROANILINE

[75] Inventor: Maurine M. Schiffmann, Minneapolis, Minn.

[73] Assignee: Sperry Rand Corporation, New York, N.Y.

[22] Filed: Apr. 27, 1972

[21] Appl. No.: 248,171

Related U.S. Application Data

[63] Continuation of Ser. No. 884,650, Dec. 12, 1969, abandoned.

[52] U.S. Cl. ........... 29/592, 250/219 D, 260/566 F, 340/173 CC, 340/173 LT, 350/160 P

[51] Int. Cl. .............................................. H01s 4/00

[58] Field of Search ....... 260/566 F, 566 R; 29/572, 29/592; 350/160 P; 340/173 CC, 173 LT; 250/219 D

[56] References Cited

UNITED STATES PATENTS

| | | | |
|---|---|---|---|
| 2,847,472 | 8/1958 | Robertson | 260/566 F |
| 2,847,473 | 8/1958 | Robertson | 260/566 F |
| 3,253,022 | 5/1966 | Linder et al. | 260/566 F X |
| 3,454,414 | 7/1969 | Andes et al. | 350/160 P |
| 3,478,097 | 11/1969 | Hart | 340/173 CC UX |
| 3,483,162 | 12/1969 | Kovacic | 260/566 F X |

OTHER PUBLICATIONS

Andes et al., "Photochromism of Salicylidene Anilene", Applied Optics, Vol. 7, No. 6, June 1968, pp. 1179–1183.

*Primary Examiner*—Charles W. Lanham
*Assistant Examiner*—Carl E. Hall

[57] ABSTRACT

A method for preparing a highly photochromic anil of 3,5 dichlorosalicylidene 2,4,6 trichloroaniline which comprises preparing a reactant mixture of 2,4,6 trichloroaniline and 3,5 dichlorosalicylaldehyde, heating the reactants, preferably while in a solvent solution of amyl alcohol, to a temperature in the range of between about 135°–145° C. and maintaining this temperature until the reaction forming 3,5 dichlorosalicylidene 2,4,6 trichloroaniline is substantially complete, and thereafter isolating the reaction product from the reactant mass by recrystallization techniques.

2 Claims, 3 Drawing Figures

Figures 1, 2:
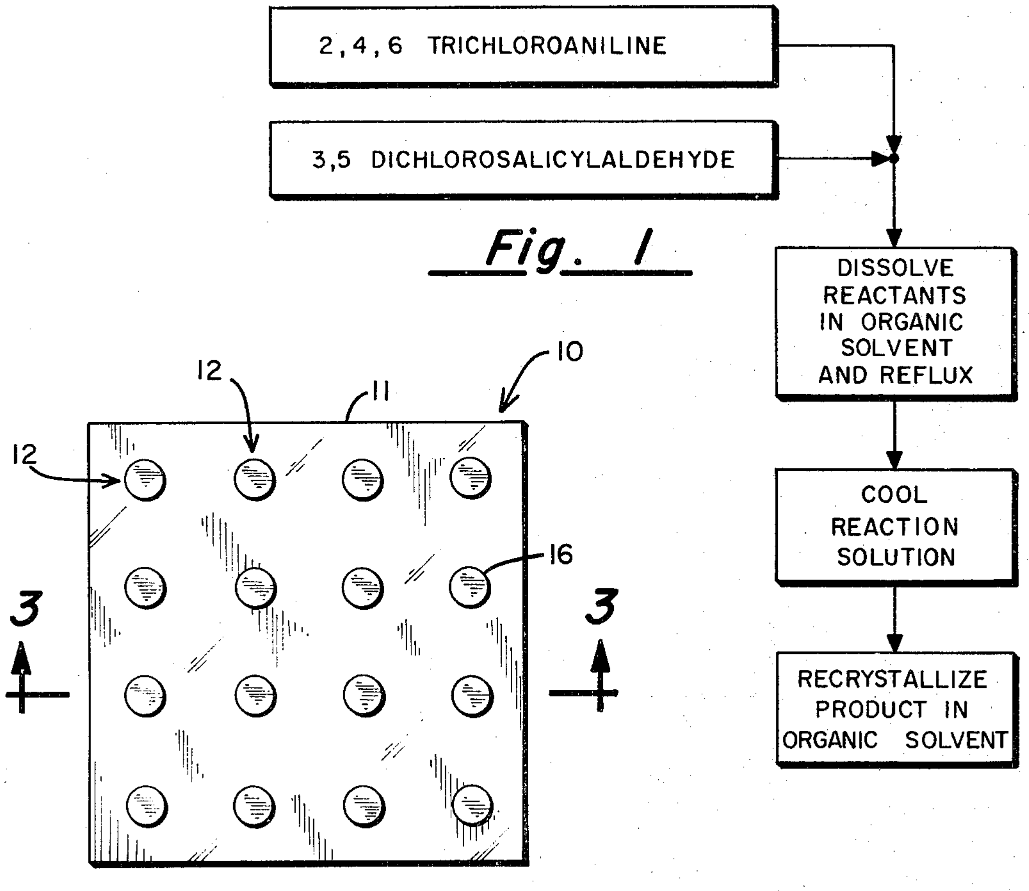

INVENTOR
*MAURINE M. SCHIFFMANN*

METHOD FOR MAKING AN INFORMATION STORAGE DEVICE HAVING PHOTOCHROMIC AREAS OF 3.5 DICHLOROSALICYLIDENE 2,4,6 TRICHLOROANILINE

CROSS-REFERENCE TO RELATED APPLICATION

This is a Continuation of application Ser. No. 884,650, filed Dec. 12, 1969, Maurine M. Schiffmann, entitled "METHOD FOR PREPARING 3,5 DICHLOROSALICYLIDENE 2,4,6 TRICHLOROANILINE," now abandoned, which application is assigned to the same Assignee as the present application.

The present invention relates generally to the preparation of an improved photochromic compound which can be exposed to certain radiation and caused to undergo a significant degree of color change from either one of two distinct and definite color forms to the other. The colors represent a change or alteration of the compound from one stable state to another, with one of the colors being obtained when the compound is irradiated by electromagnetic radiation in the range of, substantially 300–400 millimicrons, the other being obtained when the substance is irradiated with radiation in the range of substantially 450–550 millimicrons. When irradiated with radiation in the lower wave length range, the substance becomes red in color, while becoming substantially entirely bleached when exposed to radiation in the longer wave length range.

The color change occurs extremely rapidly, and the change in color state is retained by the material over an extended period of time. The bleached color state is the more stable state, and hence can be described as the "normal" state of the substance. Upon exposure to ultraviolet radiation for reasonable periods of time, the red color state may be lost, and the material will assume the bleached form. Accordingly, any cycling of the color will result in reasonably stable reversals of characteristic color, with the final color achieved being retained in the dark over extended periods of time.

The 3,5 dichlorosalicylidene 2,4,6 trichloroaniline prepared in accordance with the teachings of the present invention may be combined with a carrier matrix, if desired, thereby permitting the substance to be prepared in thin film form for ultimate coating on a transparent base, if desired.

Photochromic materials which will rapidly undergo a color change from one stable state to another with the change being sufficiently stable so as to permit the material to retain either of the states over extended periods of time, are uniquely suited for use in data processing apparatus. These materials also find use in photochromic displays, and in holographic and optical processing applications. The salicylidene anils of the present invention are useful in each of these applications, but are uniquely suited for use in data processing applications, such as for the storage of binary data. In working with photochromic materials, particularly as data storage elements for the storage of binary data, it is preferable that the color change of the material be significant and readily capable of detection. It is normally desirable that the various colors of the material include one highly transparent stable state, since this state is readily detectable using readily available components and detection apparatus. The bleached state being the "normal" or "non-activated" state is assumed by the material after elongated periods of time, and the red state can only be obtained upon exposure to the appropriate radiation.

Briefly, in accordance with the present invention, the improved photochromic material is a bistable photochromic salicylidene aniline, specifically, 3,5 dichlorosalicylidene 2,4,6 trichloroaniline. This material is prepared by initially forming a reactant mixture of 2,4,6 trichloroaniline and 3,5 dichlorosalicylaldehyde, with a modest excess of the salicylaldehyde being employed. The reactants are preferably dissolved in a suitable solvent such as amyl alcohol, and thereafter heated and refluxed at a temperature of between 135°–145° C. Upon removal from heat, and following cooling, golden colored, finely divided crystals separate from the solution. The crystals are isolated and thereafter recrystallized from a mixture of heptane and tetrahydrofuran. The separated crystals may then be rinsed repeatedly with heptane, and upon drying, the material is ready for ultimate utilization.

If desired, the anil may be incorporated in a substantially rigid, non-crystalline polymeric matrix or medium, such matrices comprising, for example, polymethylmethacrylate, mixtures of polymethylmethacrylate and polystyrene, polystyrene, polycarbonates such as Lexan, polyvinylacetate, polyvinylchloride, and epoxies. Copolymers of polystyrene methyl methacrylate (3:1) and polycarbonates may be employed. Preferably, the anil is present in the binder matrix in an amount of about three percent of anil by weight. This quantity of anil in a polymeric binder of the above types is normally within the normal solubility range.

Therefore, it is an object of the present invention to prepare an improved photochromic salicylidene anil consisting essentially of 3,5 dichlorosalicylidene 2,4,6 trichloroaniline.

It is a further object of the present invention to provide an improved technique for preparing photochromic salicylidene anils from a reactant mixture of 2,4,6 trichloroaniline and 3,5 dichlorosalicylaldehyde.

It is still a further object of the present invention to provide an improved photochromic salicylidene anil which exhibits a significant degree of color change when exposed to incident radiation of certain predetermined wave length.

Figure 3:
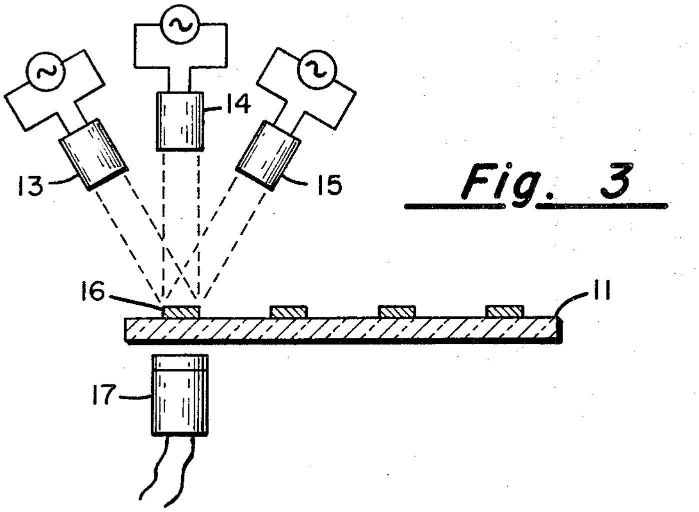

Other and further objects of the present invention will become apparent to those skilled in the art upon a study of the following specification, appended claims, and accompanying drawing wherein:

FIG. 1 is a flow diagram illustrating the preferred technique for preparing the photochromic salicylidene anils of the present invention;

FIG. 2 is a top plan view of a substrate which has been covered by a number of individual discrete areas of the photochromic material of the present invention, the discrete areas being arranged in a pattern of rows and columns; and FIG. 3 is a vertical sectional view taken along the line and in the direction of the arrows 3–3 of FIG. 2 and illustrating components or equipment utilized in combination with the photochromic films for data processing operations.

In accordance with the preferred process of the present invention, a bistable photochromic material is prepared from a reactant mixture of 2,4,6 trichloroaniline and 3,5 dichlorosalicylaldehyde. The techniques of preparation are best comprehended with a review of the examples set forth hereinafter.

EXAMPLE 1

Equimolar proportions of 2,4,6 trichloroaniline and 3,5 dichlorosalicylaldehyde were weighted in order to prepare a reaction mixture, thereby utilizing 5.9 grams (0.03 mol) of the trichloroaniline and 6.3 grams (0.033 mol) of the salicylaldehyde. The reactants were dissolved in 50 ml. amyl alcohol, and the mixture placed under reflux at a temperature of 138°–140° C. in a round bottom flask fitted with a reflux condensor. The refluxing operation was continued for a period of 48 hours, after which time the mixture was removed from heat and the reaction mixture allowed to cool to room temperature. Upon cooling, golden colored, finely divided crystals separated from the solution.

The crystals were then isolated and recrystallized from a mixture of 200 ml. heptane and 50 ml. tetrahydrofuran. The crystals were then separated from the mother liquor by filtration, then rinsed twice with heptane. Upon air drying, the yield was 6.9 grams of product having a melting point of 199°–199.5° C. Infrared analysis indicated that the product had a purity in substantial excess of 95 percent.

EXAMPLE 2

The reactants of Example 1 were weighed out, placed in a beaker and fused at a temperature of 140° C. for two hours. No solvent was employed. Thereafter, upon removal from heat, spontaneous crystallization occurs. The reaction product was then recrystallized from a mixed solvent (heptane and tetrahydrofuran).

In order to obtain products for data processing operations, the crystalline products formed are placed in a binder matrix in a quantity ranging from between about 0.01 percent and 5 percent of anil in the binder. As previously indicated, polystyrene, polymethylmethacrylate, or copolymers thereof are highly suitable, the features required being that of a rigid, transparent, and non-crystalline polymeric structure. A thin film member may be prepared by dissolving the photochromic polymer in a suitable solvent and casting a film by conventional casting techniques. Details of this technique are disclosed in the co-pending application of M. M. Schiffmann, et al., executed on even date herewith, and entitled *METHOD FOR INCORPORATING SALICYLIDENE ANILS IN POLYMERIC MATRICES.*

Attention is now directed to FIGS. 2 and 3 of the drawing wherein a useful embodiment of the invention is shown. Thus, it will be seen that the information storage plate generally designated 10 includes a lantern slide substrate 11 having a plurality of photochromic areas 12–12 disposed thereon in the form of rows and columns, and including the photochromic area 16. The photochromic area 16 is prepared in accordance with the details of preparation set forth in the co-pending application of M. M. Schiffmann, et al as described hereinabove.

In a practical embodiment, the information retaining member 10 is disposed between a plurality of radiant energy sources 13, 14 and 15, each of which is focused upon the specific discrete area 16, with a sensor element 17 being disposed on the opposite side of the element and in viewing relationship to the energy sources. The source 13 is capable of emitting radiation in the ultraviolet range such as in the range of about 350 millimicrons, this being useful for "writing" into the discrete area of bistable photochromic material 16 by continuing the exposure until the material in the discrete area 16 is converted to the red state. For converting the bleached form to the red form, radiation in the range of from about 300 millimicrons to about 400 millimicrons may be utilized, the optimum range being from between about 350 millimicrons up to about 390 millimicrons. The radiation source 14 is adapted for use as a reading or interrogating source and preferably emits short pulses of radiation in the range of about 480 millimicrons, these pulses of radiation being sensed by the sensor 17 for interrogating the material, radiation is utilized having a spectral range which substantially coincides with that certain spectral range wherein a maximum difference exists between the transmission curves of the various forms being sensed or observed. Radiation source 15 emits radiation in the range of 500 millimicrons at an intensity sufficient to convert the discrete area of photochromic substance 16 to the bleached state, the energy of the source being sufficient to convert or restore the sensitive area to this state in a short interval of time. The sensor 17 is sensitive to the level or degree at which radiation is transmitted by the photochromic material 16 while in one or the other of its stable states, and can thereby discriminate between the state of the photochromic material. Thus, the sensor is capable of detecting the quantity or intensity of radiation which is transmitted from the interrogating source by the photochromic material. The sensor 17 may thereby provide an indication of the specific bistable state of the discrete area of photochromic material 16, and this indication of state may be, of course, translated into a 0 or 1 binary state for data processing applications. If desired, the radiation source 14 which functions as an interrogation radiation source may serve a dual function of the interrogating radiation source 14 and the writing radiation source 15. Also, if desired, the various radiation sources may be provided with filters, as required, to bring the radiation spectrum into accord with the requirements of the sensitive photochromic material and also the requirement of the sensor 17.

In order to obtain radiation in the range of between about 450–550 millimicrons, an Argon laser may be utilized. These devices are commercially available and accordingly may be found useful in connection with the present invention.

It will, of course, be understood that the examples provided herein are given for providing a comprehensive disclosure, and are not to be construed as a limitation.

What is claimed is:

1. The method of preparing photochromic digital information storage cells having two stable color states which comprises active elements consisting essentially of polychlorinated anils of 3,5 dichlorosalicylidene 2,4,6 trichloroaniline which method comprises:

a. preparing a reactant mixture of 2,4,6 trichloroaniline and 3,5 dichlorosalicylaldehyde;

b. heating the reactant mixture to a temperature greater than 130° C. until the reaction forming 3,5 dichlorosalicylidene 2,4,6 trichloroaniline is substantially complete;

c. isolating the reaction product from the reactant mixture;

d. dispersing said reaction product in a generally transparent binder matrix to form an anil-binder combination;

e. casting said anil-binder combination on a planar substrate surface to form discrete areas thereon; and f. positioning of a plurality of radiant energy sources and a sensor element in viewing relationship to said discrete areas.

2. The method as defined in claim 1 being particularly characterized in that said anil-binder combination is cast on a transparent substrate, and wherein said radiant energy sources are positioned adjacent to one side of said substrate and wherein said sensor element is disposed adjacent to and in opposed relationship to said radiant energy sources on the opposite side of said substrate.

* * * * *